United States Patent [19]
Nguyen et al.

[11] 4,276,641
[45] Jun. 30, 1981

[54] METHOD AND APPARATUS FOR CONVERTING TIME-DIVISION DATA SIGNALS RECEIVED ON AN INCOMING TRUNK TO TIME-DIVISION DATA SIGNALS OF DIFFERENT FORMAT FOR TRANSMISSION OVER AN OUTGOING TRUNK

[75] Inventors: Hieu K. Nguyen, Paris; Marc P. G. Dieudonné, Igny; Jean-Paul Lager, Bougival, all of France

[73] Assignee: Le Material Telephonique, Boulogne-Billancourt, France

[21] Appl. No.: 42,410

[22] Filed: May 25, 1979

[30] Foreign Application Priority Data

May 31, 1978 [FR] France .................................. 78 16211

[51] Int. Cl.³ .............................................. H04J 3/00
[52] U.S. Cl. ...................................... 370/99; 370/111
[58] Field of Search ..................... 370/99, 82, 84, 110, 370/111

[56] References Cited

U.S. PATENT DOCUMENTS

| | | | |
|---|---|---|---|
| 3,558,823 | 1/1971 | Brilliant | 370/58 |
| 3,692,942 | 9/1972 | Inose | 370/99 |
| 4,138,596 | 2/1979 | Roche | 370/84 |
| 4,154,985 | 5/1979 | Munter | 370/84 |

*Primary Examiner*—David L. Stewart
*Attorney, Agent, or Firm*—Roland Plottel

[57] ABSTRACT

Methods and apparatus for converting time-division data signals received over an incoming trunk having $v_e$ channels into time-division data signals for transmission over an outgoing trunk having $v_s$ channels (where $v_s > v_e$).

The device includes means for storing the data bits contained in each incoming frame; means for reading at an intermediate frequency $f_i$, during read enable periods, the stored data bits corresponding to $v_e$ busy outgoing channels and for evenly distributing $v_s - v_e$ free outgoing channels amongst the $v_e$ busy outgoing channels, during read inhibit periods; and means for transmitting at a frequency $f_s$ the data bits read at the intermediate frequency $f_i$.

This device may advantageously be used in PCM telephone exchanges.

10 Claims, 4 Drawing Figures

METHOD AND APPARATUS FOR CONVERTING TIME-DIVISION DATA SIGNALS RECEIVED ON AN INCOMING TRUNK TO TIME-DIVISION DATA SIGNALS OF DIFFERENT FORMAT FOR TRANSMISSION OVER AN OUTGOING TRUNK

TECHNICAL FIELD

This invention relates generally to telecommunications. More particularly, this invention relates to methods and apparatus for converting time-division data signals received over an incoming trunk into time-division data signals of a different format for transmission over an outgoing trunk.

DISCUSSION OF THE PRIOR ART

Such a device has important application to the field of telephone switching. In particular, it permits 24-channel, time-division trunks to be connected to a time-division exchange designed for switching 30-channel, time-division trunks.

As described in the CCITT document entitled "Principal Characteristics of Primary Multiplexing Equipment" (Recommendation G.731, Geneva, 1972), in Europe there are presently two types of basic PCM switching equipment, one operating at 2048 kbits/s producing 32 time-division channels of which 30 are assigned to speech, i.e. 256 bits per frame, and the other operating at 1544 kbits/s and producing 24 time-division channels assigned to speech, i.e. 193 bits per frame, the frame frequency being 8 kHz in either case. In addition, the above-cited document describes the distribution of synchronization, speech and signalling data for both types of system.

SUMMARY OF THE INVENTION

According to one aspect of the invention, the method for converting incoming time-division data signals into outgoing time-division data signals formatted differently, both of the data streams containing synchronization, speech and signalling information, the incoming data being divided into frames received at a frequency F, each frame containing $v_e$ incoming channels assigned to speech, (i.e. $n_e$ bits received at a frequency $f_e$,) and the outgoing data being divided into frames transmitted at the same frequency F, each frame containing $v_s$ outgoing channels of which $V_s$ outgoing channels are assigned to speech, (i.e. $n_s$ outgoing bits transmitted at a frequency $f_s$) where $n_s > n_e$, $f_s > f_e$ and $f_s$ is not a multiple of $f_e$, is such that the conversion of speech data comprises the steps of:

storing the data bits contained in each incoming frame;

reading, during read enable periods at an intermediate frequency $f_i$, the stored data bits corresponding to $v_e$ busy outgoing channels and in evenly distributing during read inhibit periods $v_s - v_e$ free outgoing channels amongst the $v_e$ busy outgoing channels; and then transmitting at a frequency $f_s$ the bits read at the intermediate frequency $f_i$.

The operation of the present invention will appear more clearly from the following detailed description when taken with the appended drawings, in which:

DETAILED DESCRIPTION OF THE INVENTION

Figure 1:
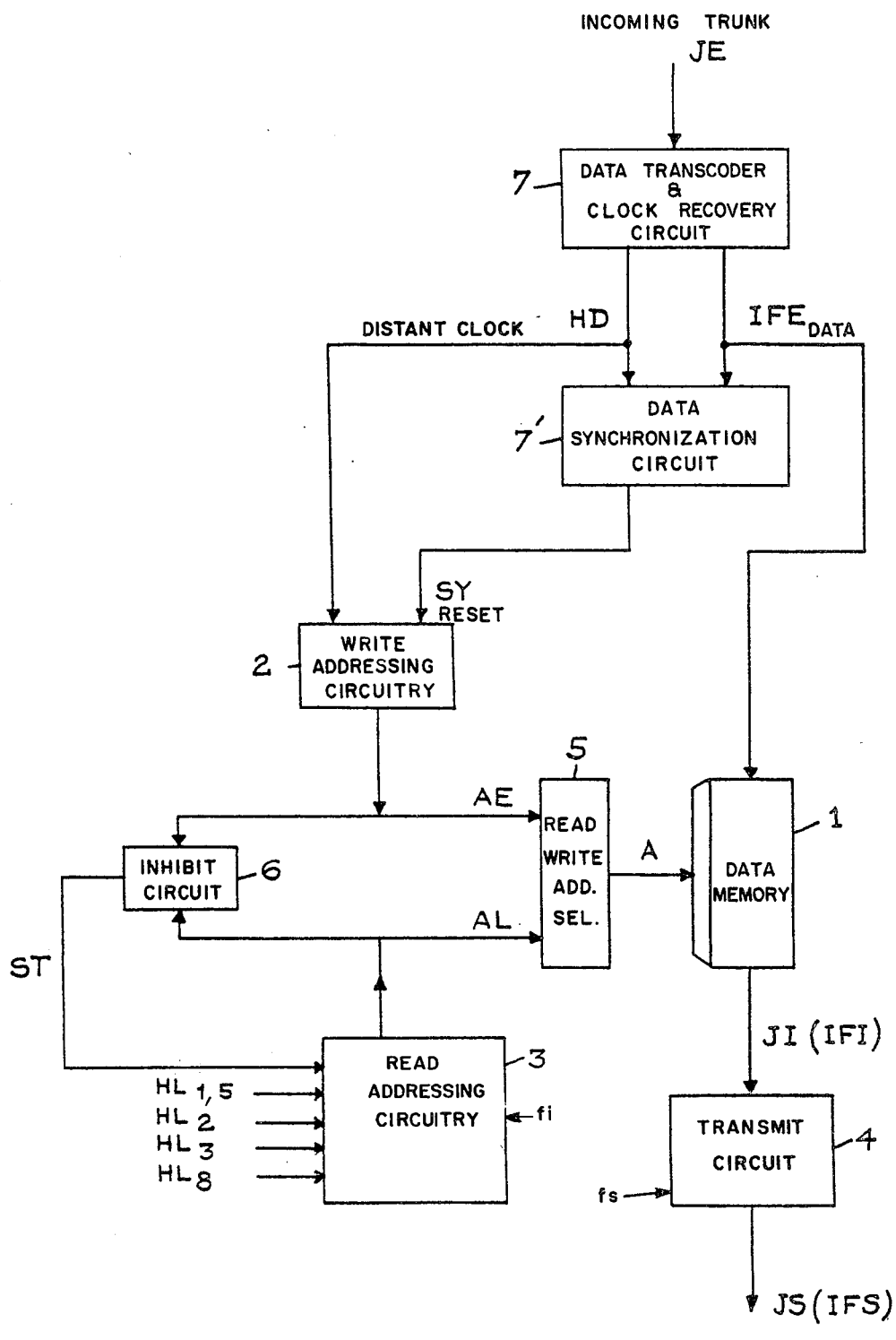
FIG. 1 is a block diagram of an illustrative conversion device in accordance with the invention.

It is seen in FIG. 1 that an illustrative conversion device in accordance with the invention comprises a data memory 1 and an addressing circuit 2 for writing into the data memory in order to store the incoming data IFE received from the incoming trunk JE; a second addressing circuit 3 for reading at an intermediate frequency $f_i$, during read enable periods, the data memorized in the data memory corresponding to $v_e$ busy outgoing channels, and for evenly distributing, during read inhibit periods, $v_s - v_e$ free outgoing channels amongst the $v_e$ busy outgoing channels; and a transmit circuit 4 for sending at a frequency $f_s$ the data read at the intermediate frequency $f_i$. The transmit circuit 4 produce the outgoing time-division data IFS which is fed to the outgoing trunk JS, whilst the data memory 1 produces the intermediate information IFI comprising the intermediate time-division data JI. A write address and read address selector 5 is provided to produce the signals for addressing the data memory 1, together with a circuit 6 for inhibiting reading and writing at the same address. An incoming data transcoding and distant clock recovery circuit 7 is also provided for generating the binary incoming data IFE and a distant clock HD of frequency $f_e$ from the bipolar data received from the bipolar data received from the incoming trunk JE.

The write address circuit 2 is activated by the distant clock HD. The write address circuit 2 is reset by a synchronization circuit 7', whose input signals consist of the incoming data IFE and the distant clock HD.

Figure 2:
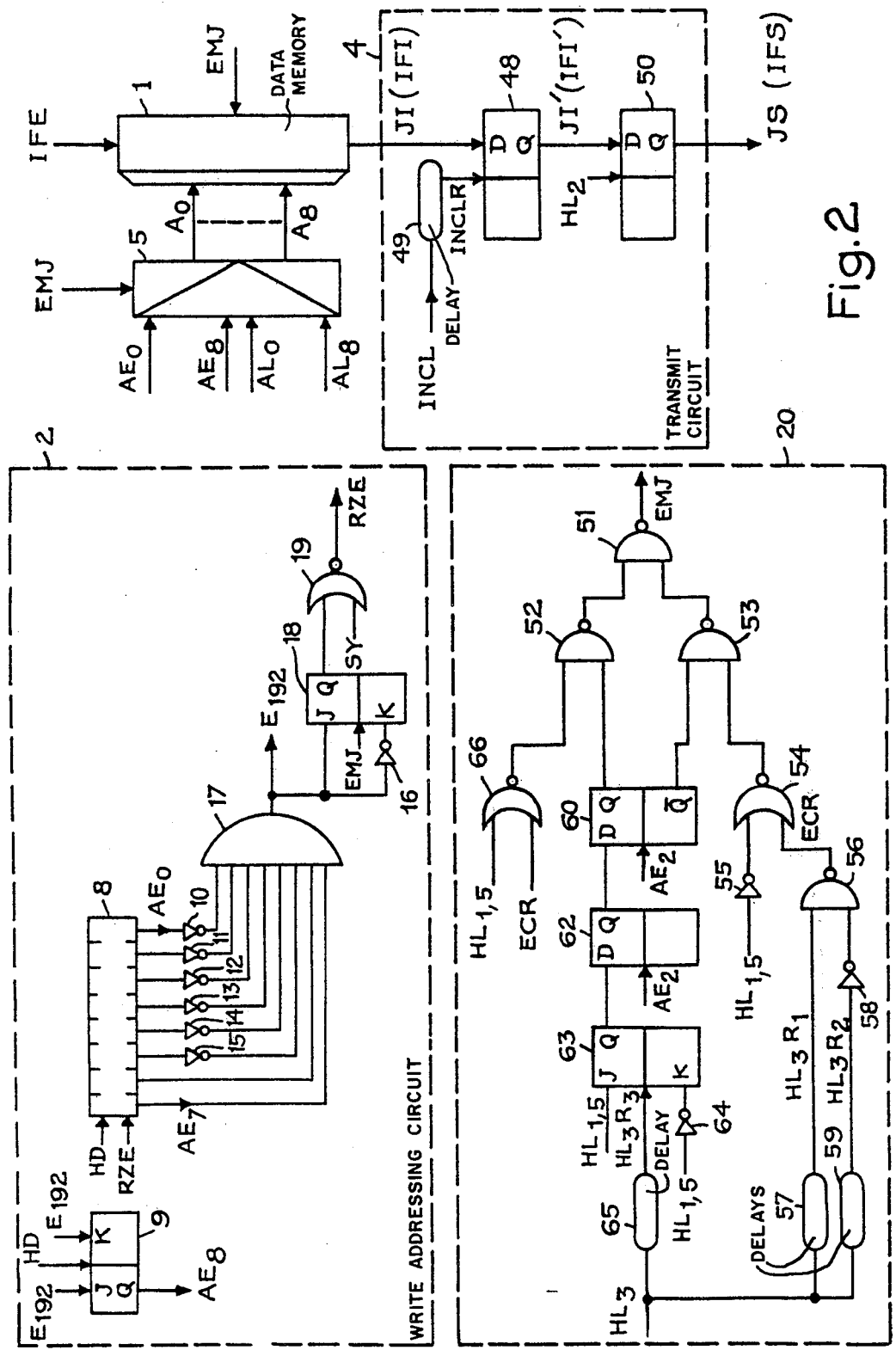
FIGS. 2 and 3 are more detailed circuit diagrams of the conversion device shown in FIG. 1.
Figure 3:
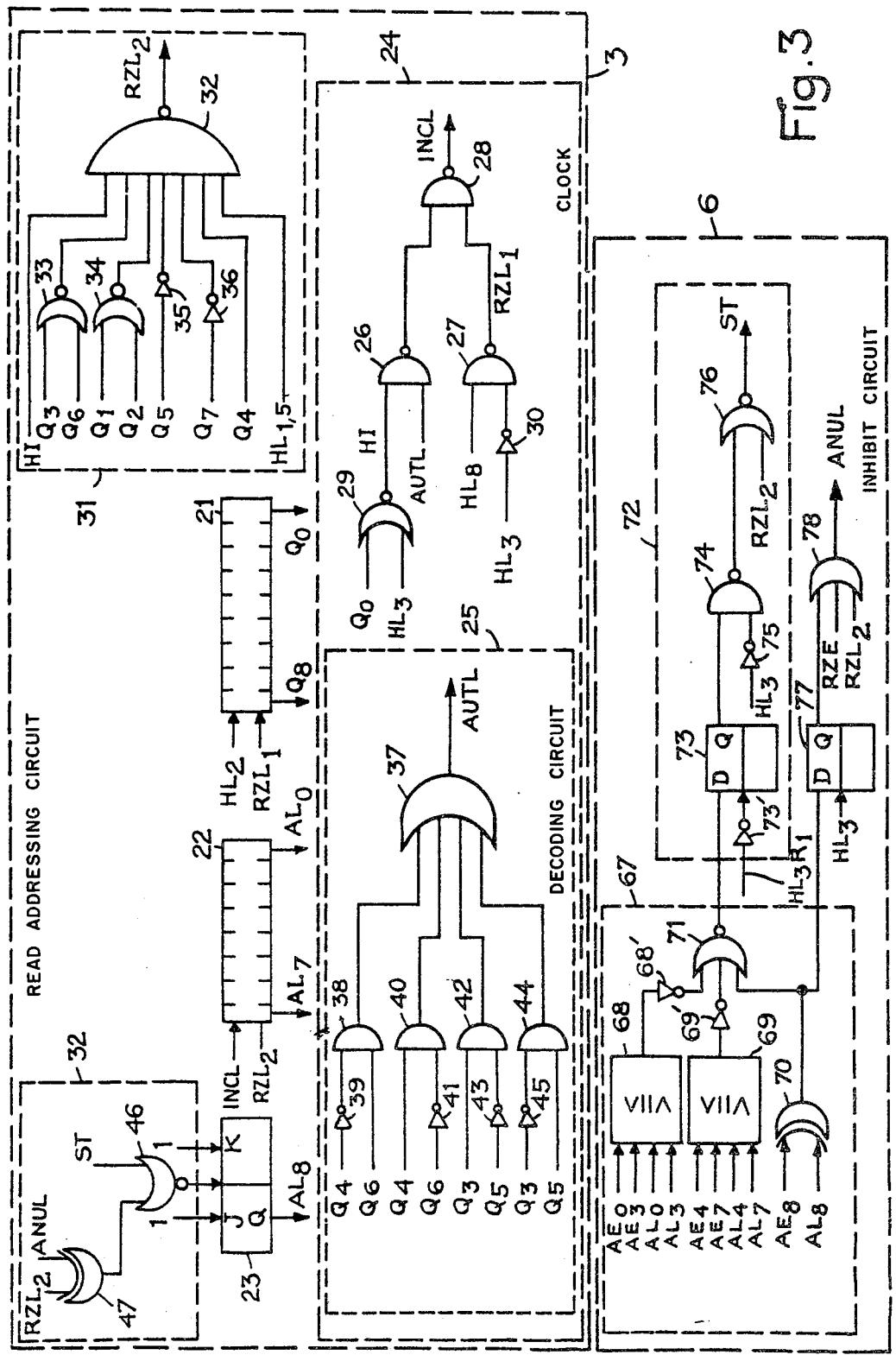
Figure 4:
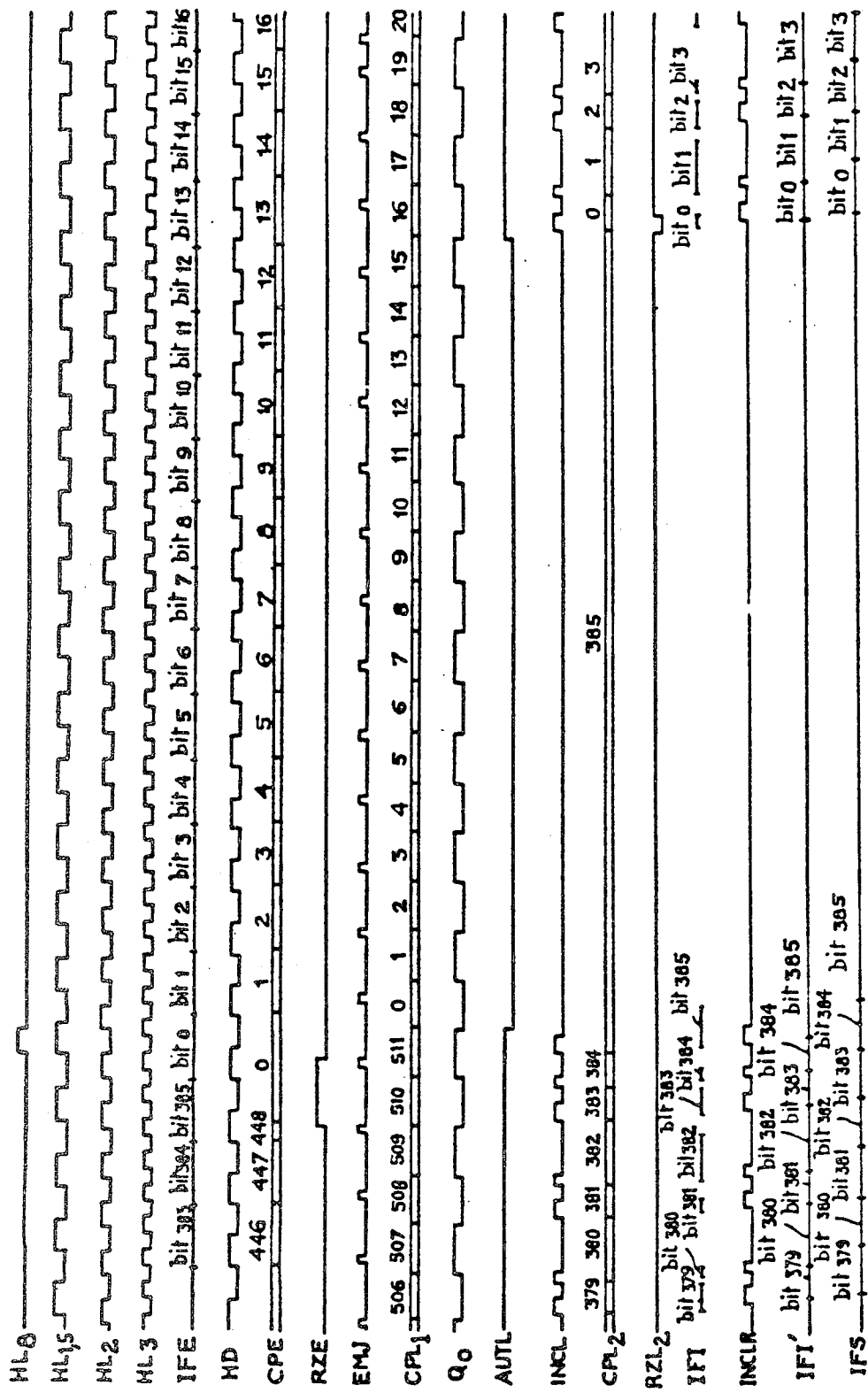
FIG. 4 is a timing diagram for the signals found in the circuits of FIGS. 2 and 3.

In the case corresponding to FIGS. 2, 3 and 4, the incoming data synchronization information occupies the last bit position of every other frame, and the synchronization bit is complemented every double-frame. In this case, the incoming data synchronization circuit 7' includes means for memorizing the bits of each incoming double-frame, means for comparing each bit of an incoming double-frame with the bit having the same rank in the previous memorized incoming double-frame, means for identifying each incoming double-frame possessing a single bit of given rank having been complemented at each incoming double-frame, and means for identifying this rank and producing the synchronization signal SY. This synchronization signal SY is therefore a pulse occurring upon reception of each synchronization bit. Since circuits 7 and 7' are not the subject of the present invention, they are not described in further detail.

The read address circuit 3 is controlled by a local clock signal $HL_{1.5}$ of frequency $f_e$, a local clock signal $HL_3$ of frequency $2f_e$, a local clock signal $HL_2$ of frequency $f_s$, a local clock signal $HL_8$ of frequency F and the output signal ST of circuit 6 inhibiting reading and writing at the same address. The write address circuit 2 and the read address circuit 3 feed the address selector 5 with a write address signal AE and a read address signal AL respectively. The address selector 5 produces the signal A addressing the data memory.

FIGS. 2, 3 and 4 correspond to the case $f_e = 1.544$ MHz, $f_s = 2.048$ MHz, $F = 8$ kHz, $v_e = 24$, $v_s = 32$, $V_s = 30$, $n_e = 193$ and $n_s = 256$. For the sake of clarity, FIG. 4 shows only that fraction of an incoming double-frame containing bits 383 to 385 and that fraction of the next incoming double-frame containing bits 0 to 15. In order to provide a better understanding of the invention, FIGS. 2 and 3 are described with reference to FIG. 4 in order to describe the operation of these circuits. An item appearing in two or all of the FIGS. 1, 2 and 3 has the same symbol in each figure.

FIG. 2 illustrates the data memory 1, the write address circuit 2, the transmit circuit 4 and the address selector 5. The data memory 1 has a capacity of 1024 one-bit words addressed by means of nine bits $A_0$ to $A_8$. The data memory 1 is capable of storing the bits of two successive incoming frames $TR_0$ and $TR_1$. The write address circuit 2 addresses the data memory 1 such that these bits are stored in the following order:

| Data Memory Write Address | Bit Stored at the Data Memory Address |
|---|---|
| 0 | Bit 0 of $TR_0$ |
| 1 | Bit 1 of $TR_0$ |
| . | . |
| . | . |
| . | . |
| 192 | Bit 192 of $TR_0$ |
| 193 | X |
| . | . |
| . | . |
| 255 | X |
| 256 | Bit 192 of $TR_1$ |
| 257 | Bit 194 of $TR_1$ |
| . | . |
| . | . |
| 448 | Bit 385 of $TR_1$ |
| 449 | X |
| . | . |
| . | . |
| 1023 | X |

The symbol X indicates no useful signal is stored at the corresponding address.

The write address circuit 2 includes a write-address counter comprising an 8-bit counter 8, a type J-K write address flip-flop 9 and a write address counter initialization circuit constituted by seven inverters 10, 11, 12, 13, 14, 15 and 16 and an AND-gate 17, a type J-K flip-flop 18 and a NOR-gate 19. Counter 8 and flip-flop 9 are activated by the distant clock signal HD of frequency $f_e$ shown in FIG. 4. Counter 8 produces bits $AE_0$ to $AE_7$. Output Q of flip-flop 9 produces the most significant bit $AE_8$. Counter 8 is reset by signal RZE obtained on the output of the NOR-gate 19. Signal RZE is shown in FIG. 4. Inputs J and K of flip-flop 9 are fed with signal $E_{192}$ obtained on the output of the AND-gate 17. AND gate 17 is an 8-input AND-gate, two of these inputs being fed with bits $AE_6$ and $AE_7$, and the six remaining inputs being fed with bits $AE_0$ to $AE_5$ inverted by inverters 10 to 15. Flip-flop 18, whose input J is connected to the output of gate 17 and whose input K is connected to the output of gate 17 via inverter 16 is activated by an address selection signal EMJ produced by a circuit 20. Signal EMJ is also used for enabling the writing of data into memory 1 and for controlling the address selector 5. NOR-gate 19 is fed with the synchronization signal SY and the signal available on output Q of flip-flop 18.

Circuit 20, which produces the address selection signal EMJ, includes a NAND gate 51 which generates signal EMJ and which has one input connected to the output of a NAND-gate 52 and another input connected to the output of a NAND-gate 53. NAND-gate 53 has one input connected to the output of a NOR-gate 54 connected between signal $HL_{1.5}$ inverted by means of inverter 55 and the output signal ECR of a NAND-gate 56. NAND-gate 56 is fed with signal $HL_3 R_1$, which is the local clock signal $HL_3$ delayed by the data memory access time by means of a delay line 57, and signal $HL_3 R_2$ inverted by inverter 58, signal $HL_3 R_2$ being derived from signal $HL_3$ by delaying the latter for a period equal to the data memory read access time. NAND-gate 53 has another input connected to output $\overline{Q}$ of a type D flip-flop 60, whose input D is connected to output Q of another type D flip-flop 62 and which is activated by signal $AE_2$. Input D of flip-flop 62 is connected to output Q of a type J-K flip-flop 63 and is activated by signal $AE_2$. Input J of flip-flop 63 is fed with the local clock signal $HL_{1.5}$, whilst input K is fed with the local clock signal $HL_{1.5}$ inverted by an inverter 64. Flip-flop 63 is activated by signal $HL_3 R_3$, which is signal $HL_3$ delayed by the width of the data memory write enable signal by means of a delay line 65. One input of NAND gate 52 is connected to output Q of flip-flop 60, whilst the other input is connected to the output of a NOR gate 66 connected between signal $HL_{1.5}$ and signal ECR obtained on the output of NAND gate 56.

The transmit circuit 4 includes a first type D flip-flop 48, whose input D is fed with the intermediate data IFI on the intermediate trunk JI, activated by signal INCLR, which is signal INCL (shown in FIG. 4) delayed by the data memory read access time by means of a delay line 49. The transmit circuit 4 possesses a second type D flip-flop 50, whose input D is fed with the intermediate data IFI' on the intermediate trunk JI' obtained on output Q of the first flip-flop 48, activated by the local clock $HL_2$. The outgoing data IFS available on the output of the second flip-flop 50 constitute the data fed to the outgoing trunk JS.

The address selector 5 is an 18-input multiplexer fed with signals $AE_0$ to $AE_8$ constituting the AE write address signal, and with signals $AL_0$ to $AL_8$ constituting the read address signal AL. This multiplexer is controlled by the address selection signal EMJ. Let CPE be the decimal variable corresponding to the binary variable constituted by bits $AE_0$ to $AE_8$.

The write address counter initialization circuit is such that signal $E_{192}$ is active for CPE=192, and is such that signal RZE is active for CPE=192 and CPE=385. As shown in FIG. 4, the variable CPE varies from 0 to 192 and then from 256 to 448 at the rate of the distant clock HD, enabling the data to be recorded in the data memory in accordance with the previous table. FIG. 3 shows the read address circuit 3 and the circuit 6 inhibiting reading and writing at the same address. The read address circuit 3 includes firstly a 9-bit counter 21 ($2^9 = 2 \times 256$), secondly a read address counter constituted by an 8-bit counter 22 and a type J-K read address flip-flop 23, and thirdly a read address counter clock circuit 24 constituted by a circuit 25 decoding the values 0, 5, 10, 15, 16, 21, 26 and 31 of counter 21, three NAND-gates 26, 27 and 28, a NOR-gate 29 and an inverter 30. The read address circuit 3 also includes a read address counter initialization circuit consisting of a circuit 31 resetting counter 22 and a circuit 32 inverting the most significant bit of the read address counter. Counter 21 is a 9-bit counter activated by the local clock $HL_2$ and reset by signal $RZL_1$ obtained on the output of NAND gate 27, which is fed with signal $HL_8$ and signal $HL_3$ inverted by inverter 30. Let $Q_0$ to $Q_8$ represent the output bits of counter 21, $Q_0$ corresponding to the least significant bit and $Q_8$ corresponding to the most significant bit. Let $CPL_1$ be the decimal variable corresponding to the binary variable constituted by bits $Q_0$ to $Q_8$. As shown in FIG. 4, counter 21 counts at the rate of the local clock $HL_2$ from the value $CPL_1 = 0$ to the value $CPL_1 = 511$, and is reset by the pulses of the local clock $HL_8$. Counter 22 is an 8-bit counter activated by signal INCL produced by NAND-gate 28 and reset by signal $RZL_2$ produced by the resetting circuit 31. NAND-gate 28 is fed with signal $RZL_1$ and the signal obtained on the output of NAND-gate 26. NAND gate 26 is fed with the data memory read enable signal AUTL produced by decoding circuit 25 and with signal HI obtained on the output of NOR gate 29 connected between signals $Q_0$ and $HL_3$. Signal HI constitutes the signal of intermediate frequency $f_i$. The resetting circuit 31 possesses a 7-input NAND-gate 32 producing signal $RZL_2$. A first input of NAND-gate 32 is fed with signal HI of intermediate frequency $f_i$. A second input of NAND-gate 32 is fed with the signal obtained on the output of a NOR gate 33 connected between bits $Q_3$ and $Q_6$. A third input of NAND-gate 32 is fed with the signal obtained on the output of a NOR-gate 34 connected between bits $Q_1$ and $Q_2$. A fourth input of NAND gate 32 is fed with bit $Q_5$ inverted by an inverter 35. A fifth input of NAND-gate 32 is fed with bit $Q_7$ inverted by an inverter 36. A sixth input of NAND-gate 32 is fed with bit $Q_4$. A seventh input of NAND-gate 32 is fed with the local clock signal $HL_{1.5}$.

The decoding circuit 25 includes a 4-input OR-gate 37 producing signal AUTL. A first input of OR-gate 37 is fed with the signal obtained on the output of an AND-gate 38 fed with bit $Q_6$ and bit $Q_4$ inverted by an inverter 39. A second input of OR gate 37 is fed with the signal obtained on the output of an AND-gate 40 fed with bit $Q_4$ and bit $Q_6$ inverted by an inverter 41. A third input of OR-gate 37 is fed with the output signal of an AND-gate 42 fed with bit $Q_3$ and bit $Q_5$ inverted by an inverter 43. A fourth input of OR-gate 37 is fed with the output signal of an AND-gate 44 fed with bit $Q_5$ and bit $Q_3$ inverted by an inverter 45.

Circuit 32 inverting the most significant bit of the read address counter includes a NOR-gate 46 of which one input is fed with the frame skip signal ST in the form of a pulse when circuit 6 inhibiting reading and writing at the same address detects identity between the data memory read and write addresses. A second input of NOR-gate 46 is fed with the output signal of an exclusive OR-gate 47 fed with signal $RZL_2$ and signal ANUL produced by circuit 6 inhibiting reading and writing at the same address.

Signal ANUL is active when signal RZE is active or when signal $RZL_2$ is active or again when the most significant bits of the read and write address signals $AE_8$ and $AL_8$ are the same.

In addition, in order to allow inversion of the most significant bit $AL_8$, inputs J and K of flip-flop 23 are fed with logical "1's". Inverting the most significant bit $AL_8$ results in reading frame $TR_0$ instead of frame $TR_1$, or vice-versa.

Circuit 6 inhibiting reading and writing at the same data memory address possesses firstly a read and write address comparator 67 consisting of two 4-bit comparators 68 and 69, two inverters 68' and 69', an exclusive OR-gate 70 and a NOR-gate 71, and secondly a circuit 72 for producing the frame skip signal ST which occurs as a pulse in the event of equal read and write addresses detected by comparator 67. NOR-gate 71 is a 3-input gate whose first input is fed with the output signal of comparator 68 inverted by inverter 68', whose second input is fed with the output signal of comparator 69 inverted by inverter 69', and whose third input is fed with the output signal of the exclusive OR gate 70.

Comparator 68 compares bits $AE_0$ to $AE_3$ with bits $AL_0$ to $AL_3$. Comparator 69 compares bits $AE_4$ to $AE_7$ with bits $AL_4$ to $AL_7$. The inputs of the exclusive-OR gate 70 consist of bits $AE_8$ and $AL_8$.

Circuit 72 possesses a type D flip-flop 73, whose input D is connected to the output of NOR-gate 71 activated by signal $HL_3$ $R_I$ inverted by an inverter 73. Circuit 72 also possesses a NAND-gate 74 fed with the signal obtained on output Q of flip-flop 73 and signal $HL_3$ inverted by an inverter 75. Finally, circuit 72 also possesses a NOR-gate 76 fed with the output signal of NAND-gate 74 and signal $RZL_2$. Signal ST is produced by NOR-gate 76. In addition, circuit 6 includes a type D flip-flop 77 and an OR-gate 78 producing signal ANUL required by circuit 32 inverting the most significant read address bit. Input D of flip-flop 76 is fed with the output signal of the exclusive OR-gate 70. Flip-flop 77 is activated by the local clock signal $HL_3$. One input of OR-gate 78 is fed with the signal obtained on output Q of flip-flop 77, another input is fed with signal RZE and a third input is fed with signal $RZL_2$. OR gate 78 produces signal ANUL.

Let $CPL_2$ be the decimal variable corresponding to the binary variable constituted by bits $AL_0$ to $AL_8$. As shown in FIG. 4, variable $CPL_2$ varies at the rate of clock INCL from 0 to 192 and then from 192 to 385, enabling the data memory to be read at the rate of clock INCL and in the order in which data were written.

For each outgoing frame, clock INCL thus enables the memorized bits corresponding to 24 busy outgoing channels to be read at the intermediate frequency $f_i$ during the read enable period (AUTL = "1" in FIG. 4), and the 8 free outgoing channels to be distributed on the outgoing channels 0, 5, 10, 15, 16, 21, 26 and 31 during the read inhibit periods (AUTL = "0" in FIG. 4). Intermediate data of the form shown in FIG. 4 are thus obtained on the output of the data memory 1. It is also seen in FIG. 4 that although the intermediate data IFI constitute a discontinuous signal, the intermediate data IFI' constitute a continuous signal moreover delayed with respect to IFI by a period equal to the data memory read access time. FIG. 4 also shows that the outgoing data IFS differ from the intermediate data IFI' in that the outgoing bit rate is equal to the frequency of signal $HL_2$, i.e. 2 MHz.

Although the principles of the present invention are described above in relation with a practical example, it should be clearly understood that the said description is given as an example only and does not limit the scope of the present invention.

We claim:

1. A method of converting a time-division data signal received over an incoming trunk into a time-division data signal of a different format for transmission over an outgoing trunk, each data signal including synchronization, speech and signalling information, the incoming data signal being divided into frames received at a frequency F, each frame containing $v_e$ incoming channels assigned to speech, (i.e. $n_e$ incoming bits received at a frequency $f_3$,) said outgoing data signal being divided into frame transmitted at the same frequency F, each frame containing $v_s$ outgoing channels, of which $V_s$ channels are assigned to speech, (i.e. $n_s$ outgoing bits transmitted at a frequency $f_s$) where $n_s > n_e$, $f_s > f_e$ and $f_s$ is not a multiple of $f_e$ characterized by the steps of:

storing the data bits contained in each frame of the incoming data signal;

reading at an intermediate frequency $f_i$, during read-enable periods, the stored data bits corresponding to $v_e$ busy outgoing channels, and evenly distributing $v_s - v_e$ free outgoing channels amongst the $v_e$ busy outgoing channels during read-inhibit periods; and then transmitting at a frequency $f_s$ the bits read-out at the intermediate frequency $f_i$.

2. A method in accordance with claim 1, wherein $v_e$ is equal to 24 and $v_s$ is equal to 32, characterized in that the 8 free outgoing channels are distributed to the outgoing channels designated channels 0, 5, 10, 15, 16, 21, 26 and 31.

3. Apparatus for converting a time-division data signal received over an incoming trunk into a time-division data signal of a different format for transmission over an outgoing trunk, each data signal including synchronization, speech and signalling information, the incoming data signal being divided into frames received at a frequency F, each frame containing $v_e$ incoming channels assigned to speech, (i.e. $n_e$ incoming bits received at a frequency $f_e$,) said outgoing data signal being divided into frames transmitted at the same frequency F, each frame containing $v_s$ outgoing channels, of which $V_s$ channels are assigned to speech, (i.e. $n_s$ outgoing bits transmitted at a frequency $f_s$) where $n_s > n_e$, $f_s > f_e$ and $f_s$ is not a multiple of $f_e$ characterized by: means for storing the data bits contained in each incoming frame; means for reading, at an intermediate frequency $f_i$ and during read-enable periods, the stored data bits corresponding to $v_e$ busy outgoing channels and for evenly distributing $v_s - v_e$ free outgoing channels amongst the $v_e$ busy outgoing channels during read inhibit periods; and, means for transmitting, at a frequency $f_s$, the data read-out at the intermediate frequency $f_i$.

4. Apparatus according to claim 3, wherein $v_e = 24$, and $v_s = 32$ characterized in that said means for reading reads the memorized bits corresponding to 24 busy outgoing channels and distributes 8 free outgoing channels to outgoing channels number 0, 5, 10, 15, 16, 21, 26 and 31 during read inhibit periods.

5. Apparatus according to claim 3 or claim 4 characterized in that said means for storing the data bits contained in each incoming frame comprises:

means for storing the bits comprising two successive incoming frames, said bit-storing means having a capacity of at least n one-bit words; and means, connected to said bit-storing means, for selectively addressing said bit-storing means to write data thereto, said bit-storing means being addressed by an m-bit address word where $n = 2^m$ and $2^{m-1} \leq 2n_e \leq 2^m$.

6. Apparatus according to claim 5 further comprising: means, connected to the source of the incoming data, for recovering the distant clock signal; and means, connected to the output of said clock recovering means, for generating a signal for synchronizing said incoming data, characterized in that said selective addressing means comprises: means, enabled by said recovered clock signal, for counting the bits in said m-bit address word, the (m−1) least significant bits thereof being reset by said synchronizing signal generating means or whenever the value of the word comprising the (m−1) least significant bits stored in said counting means passes through $n_e$, the most significant bit thereof changing its binary value when the word comprising the (m−1) least significant bits passes through $n_e$.

7. Apparatus according to claim 4 further comprising: means for generating a local clock signal of frequency F; and means for generating a local clock signal of frequency $f_s$, characterized in that said stored data bit reading means comprises means for generating an address for reading data from said data storing means, said address generating means including:

means, enabled by the output of said means for generating a local clock of frequency $f_s$, for counting at least p bits, $2^p = 2n_s$, said counting means being reset by the output of said means for generating a local clock of frequency F;

means, reset when the count in said p-bit counting means passes through 16, for counting at least m bits in said reading address; and means for generating a clock signal for said m-bit counting means, said clock generating means comprising:

(a) means for decoding count values of 0, 5, 10, 15, 16, 21, 26, and 31 in said p-bit counting means; and (b) means, connected to the output of said decoding means and to the output of the means for generating the intermediate frequency $f_i$, for performing a logical AND operation on said outputs, the output of said logical AND performing means comprising the output of said clock generating means.

8. Apparatus according to claim 7 further comprising: means for generating a local clock signal of frequency $2f_e$, characterized in that said means for generating the intermediate $f_i$ comprises:

means, connected to the output of said means for generating a local clock signal of frequency $2f_e$ and to the output of the least significant stage in said p-bit counting means, for performing a locigal AND operation on said outputs.

9. Apparatus according to claim 7 further comprising: means for generating a local clock signal of frequency $2f_e$, characterized in that said data transmitting means comprises:

means for generating a first signal, which signal corresponds to the clock signal for said m-bit counting means delayed by the time interval required to access said data bit storing means for read-out;

means, enabled by said first signal, for following the data read-out from said data storing means; and means, enabled by the output of said means for generating a local clock signal of frequency $f_s$, for following the output of said data read-out following means.

10. Apparatus according to claim 7 characterized by: means for inhibiting the simultaneous reading and writing of the same address, said inhibiting means including means for comparing the instantaneous write address, said inhibiting means, in the event of an equality between the two addresses, generating a frame skip pulse for inverting the most significant bits stored in said m-bits counter.

\* \* \* \* \*